United States Patent [19]

Alexandrov et al.

[11] Patent Number: 4,564,318

[45] Date of Patent: Jan. 14, 1986

[54] GATE OF THE PIPE-LINE OF A PNEUMATIC CONVEYER USED FOR TRANSPORTING CONTAINERS

[75] Inventors: Adolf M. Alexandrov; Jury A. Tsimbler; Vitaly G. Iljukhin; Jury A. Yashin; Igor V. Kiselev, all of Moscow, U.S.S.R.

[73] Assignee: Spetsialnoe Konstruktorskoe Bjuro "Transprogress", Moscow, U.S.S.R.

[21] Appl. No.: 584,258

[22] PCT Filed: Jun. 25, 1982

[86] PCT No.: PCT/SU82/00022

§ 371 Date: Jan. 31, 1984

§ 102(e) Date: Jan. 31, 1984

[87] PCT Pub. No.: WO84/00146

PCT Pub. Date: Jan. 19, 1984

[51] Int. Cl.[4] .......................................... B65G 51/22
[52] U.S. Cl. ................................. 406/192; 406/182; 406/74
[58] Field of Search .................... 406/74, 52, 182, 192

[56] References Cited

U.S. PATENT DOCUMENTS 2,690,931 10/1954 Baresch ............................. 406/182
4,459,069 7/1984 Ahr et al. ............................ 406/74

FOREIGN PATENT DOCUMENTS 686959 of 0000 U.S.S.R. .
500144 of 0000 U.S.S.R. .

Primary Examiner—Andres Kashnikow
Assistant Examiner—L. E. Williams
Attorney, Agent, or Firm—Ladas & Parry

[57] ABSTRACT

A gate comprising a body (1) hermetically connected to inlet and outlet branch pipes (2,3) that are arranged coaxially relative to each other and connected to the pipe-line of the pneumatic conveyer. The body (1) accommodates a branch pipe (4) having a cross-section corresponding to the cross-sections of the inlet (2) and outlet (3) branch pipe and kinematically connected to a drive (5) turning it. Rigidly secured to the outer wall of the branch pipe (4) disposed in the body (1) is a damper (6) used to overlap one of the branch pipes (2) connected to the body (1). The damper (6) mounts a ring-like member (7) made from a resilient material. The shape of the member (7) corresponds to the cross-section of the inlet branch pipe (2) to be overlapped. The branch pipe (4) is mounted in the body (1) so that it can swing to a certain extent in a plane perpendicular to the plane of the damper (6) and relative to an axis (8) passing below the longitudinal axis (9) of the inlet (2) and outlet (3) branch pipes. Provision is made for a catch (14) of the position of the branch pipe (4) the catch (14) being actuated by the drive (5) turning the branch pipe.

2 Claims, 3 Drawing Figures

GATE OF THE PIPE-LINE OF A PNEUMATIC CONVEYER USED FOR TRANSPORTING CONTAINERS

FIELD OF THE INVENTION

The present invention relates to pneumatic conveyers of containers and, more particularly, to gates of the pipe-lines of the conveyers.

DESCRIPTION OF THE PRIOR ART

Known in the art is a gate of the pipe-line of a pneumatic conveyer of containers, comprising a body hermetically connected with inlet and outlet branch pipes that are arranged coaxially. The branch pipes are connected to the pipe-line of the pneumatic conveyer. The body accomodates one more branch pipe whose cross-section corresponds to those of the inlet and outlet branch pipes. This branch pipe is kinematically connected with a drive that positions it coaxially relative to the inlet and outlet branch pipes in the case when containers go through the gate in transit. The branch pipe disposed in the body carries a flat damper hingedly coupled with a bracket rigidly secured on the branch pipe. The branch pipe disposed in the body is kinematically connected with the drive via a shaft positioned perpendicularly to the longitudinal axis of the branch pipe and rigidly connected therewith. (c.f. for example, USSR Inventor's Certificate No. 500,144, Cl. B 65 53/56, of 1977, published in Bulletin "Discoveries, Inventions, Industrial Designs and Trade Marks," v. 3, 1976).

The known gate does not provide for a tight adherence of the damaper to one of the branch pipes when the latter is overlapped, as a result of which some compressed air may leak out and consequently, some power be wasted.

DISCLOSURE OF THE INVENTION

The present invention had as its task provision of such a gate of the pipe-line of a pneumatic conveyer of containers, in which the damper and the branch pipe would be made so as to provide for a tight and reliable hermetic sealing of one of the (inlet or outlet) branch pipes when it is overlapped.

The above task is accomplished by that in a gate for the pipe-line of a pneumatic conveyer of containers, comprising a body hermetically connected to inlet and outlet branch pipes which are arranged coaxially and are connected to the pipe-line of the pneumatic conveyer, which accomodates a branch pipe of a cross-section corresponding to those of the inlet and outlet branch pipes, said branch pipe being kinematically connected to a turning drive to be connected to the inlet and outlet branch pipes and carrying a damper for overlapping one of the branch pipes connected to the body, according to the invention, the damper for overlapping one of the branch pipes is rigidly secured to the outer wall of the branch pipe disposed in the body and has a sealing member which is made from a resilient material and whose shape corresponds to the cross-section of the branch pipe being overlapped, the branch pipe being disposed in the body so that the damper can swing to a certain extent relative to an axis disposed in a plane parallel to the plane of the damper and passing below the longitudinal axis of the inlet and outlet branch pipes, and being provided with a catch of the position of the branch pipe when one of the branch pipes is overlapped, said catch being actuated by the turning drive.

It is expedient to make one of its walls serve as the damper in case the branch pipe is of a rectangular cross-section.

While being relatively simple in its design, the gate of the pipe-line of the pneumatic conveyer of containers, built in accordance with the present invention, provides for a reliable hermetic sealing of one of the branch pipes and for a decrease in the wear of the ring-like sealing member when the damper is being brought away from the branch pipe due to the fact that the branch pipe is so mounted in the body that it can swing therein.

SUMMARY OF THE ACCOMPANYING DRAWINGS

The following description of a specific embodiment of the present invention is given with reference to the accompanying drawings, in which.

BEST MODE OF CARRYING THE INVENTION INTO EFFECT

Figure 1:
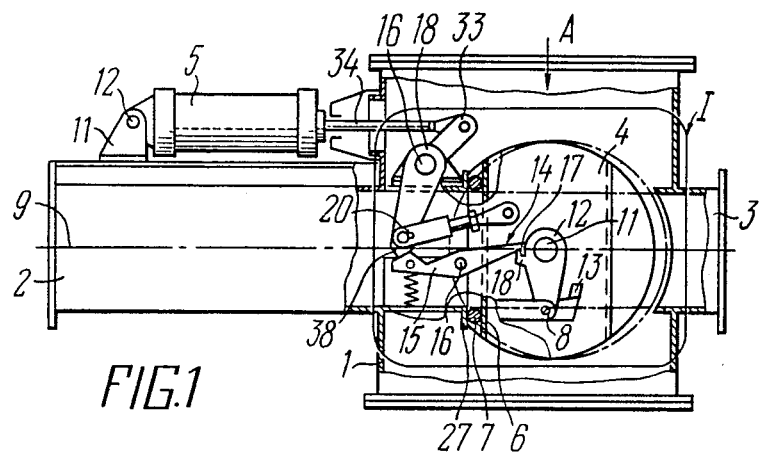
FIG. 1 shows a gate for the pipe-line of the pneumatic conveyer of containers, according to the invention, a side view.

A gate comprises a body 1 (FIG. 1) having inlet 2 and outlet 3 branch pipes which are arranged coaxially and are connected to the pipe-line (not shown) of the pneumatic conveyer. The body 1 accomodates a branch pipe 4 having a shape and sizes of its cross-section identical to the shape and sizes of the cross-section of the branch pipes 2 and 3 to provide for a transit passage of containers through the gate when it is positioned coaxially relative to the branch pipes 2 and 3. The end portions of the branch pipe 4 are made rounded along a radius, a recess 2a is made in the branch pipe 2 at its end portion facing the pipe branch 4, the shape of the recess 2a corresponding to the shape of the rounded end portion of the branch pipe 4, and the end portion of the branch pipe 3 is of a shape that mates the shape of the end portion of the branch pipe 4. The branch pipe 4 is kinematically coupled with a drive 5 of turning, which in the embodiment under description is essentially a power cylinder bearing the same position 5 and mounted on the branch pipe 2. As is shown in FIG. 2, in the present embodiment the branch pipe 4 is of a rectangular cross-section corresponding to the shape of the cross-sections of the branch pipes 2 and 3. One of the walls of the branch pipe 4 and, namely, the wall 6 serves as a damper overlapping the inlet branch pipe 2 and having the same position 6.

To provide for a more hermetic sealing of the branch pipe 2, the damper 6 has a ring-like sealing member 7 which is secured thereto and is made from a resilient material. The shape of the member corresponds to the shape of the cross-section of the branch pipe 2 being overlapped.

In order to decrease during operation the wear of the member 7, the branch pipe 4 is mounted in the body 1 so that it can swing in a plane perpendicular to the plane of the damper relative to coaxial axles 8 arranged below the geometrical longitudinal axis 9 of the branch pipes 2 and 3. The axles 8 are secured on brackets 10 fixed in the body 1 symmetrically to the longitudinal geometrical axis 9. Axles II that are hingedly coupled with the axles 8 by means of intermediate links 12 and are arranged coaxially relative to one another are secured to the walls of the branch pipe 4, that are adjacent to its wall (damper) 6 (FIG. 2).

In order to limit the angle of swinging of the branch pipe 4 when the gate is brought into the position allowing for transit passage of containers (not shown) in the direction from the branch pipe 2 (to the right in the drawing), the brackets 10 have stops 13 secured thereon.

Figure 3:
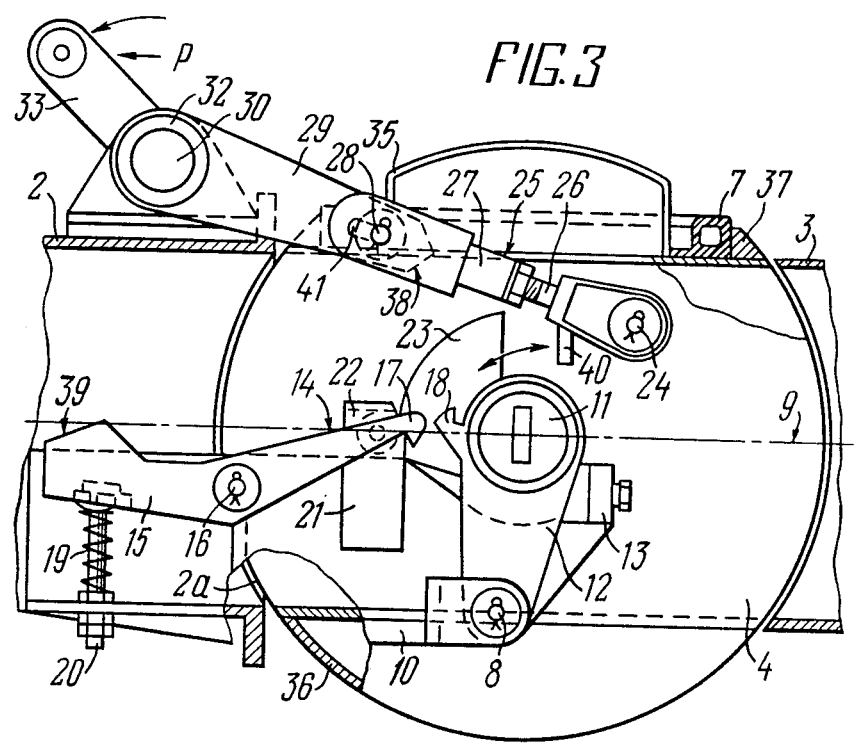
FIG. 3 is position 1 in FIG. 1 in the case of coaxial disposition of all the branch pipes/an enlarged view/.

Each bracket 10 mounts a catch 14 of the position of the branch pipe when the inlet branch pipe 2 is overlapped. The catch 14 comprises a lever 15 mounted on an axle 16 secured on the bracket 10. One arm of the lever 15 has a hook 17 which engages a hook 18 provided on the intermediate link 12. The other arm of the lever 15 is spring-loaded relative to the body 1 with the aid of a spring 19 (FIG. 3) mounted on a rod 20 secured to the bracket 10. Each bracket 10 mounts a stop 21 carrying a roller 22, and the branch pipe 4 has a plate 23 secured thereon and having the shape of a segment, the cylindrical and flat surfaces of the segment interacting with the roller 22.

The kinematic connection of the branch pipe 4 with the drive 5 comprises an axle 24 secured on the branch pipe 4 and having a tie 25 which is mounted thereon and can adjust the length by means of the "screw 26-nut 27" couple. The tie 25 is connected by means of a joint 28 with a tie 29 which by its other end portion is rigidly coupled with a shaft 30 mounted in bearings 31 (FIG. 2) on brackets 32 mounted on the body 1.

The shaft 30 is rigidly connected with a crank 33 (FIG. 3) which is hingedly connected to a rod 34 (FIG. 2) of the power cylinder 5.

Secured to the wall 6 of the branch pipe 4, serving as a damper, and inside the member 7 is a profiled plate 35 (FIG. 3) which, with the branch pipe 2 overlapped, enters the latter and serves as a bumper for the containers coming to the gate. Secured on the opposite wall of the branch pipe 4 is a profiled plate 36 serving as a bumper.

Secured to the wall 6 to limit deformation of the member 7 is a ring-like stop 37 which is of a shape corresponding to that of the member 7.

With the gate closed, the end portion of the tie 29 interacts with the spring-loaded arm of the lever 15, for which purpose mating bevels 38 and 39 are made at its end portion and the end portion of the tie 29.

The gate according to the present invention functions as follows.

Figure 2:
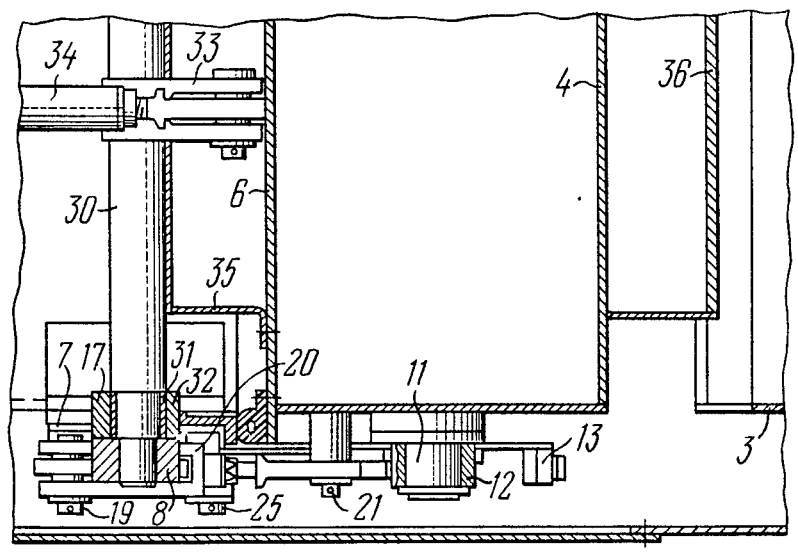
FIG. 2 is a view taken along the arrow A in FIG. 1, with partial extractions/an enlarged view/.

With the gate in the closed position, as is shown in FIG. 1, the damper 6 adjoins the end portion of the branch pipe 2, whereby reliable hermetic sealing of the branch pipe 2 is provided owing to deformation of the member 7, the links 12 occupy the extreme left (according to the drawing) position fixed by the catches 14, and the hook 17 of the lever 15 of each catch 14 is engaged with the hook 18 of each intermediate link 12.

At the same time, the bevel 38 of the tie 29 contacts the bevel 39 of the spring-loaded arm of the lever 15, the stop 40 (FIG. 3) of the branch pipe 4 contacts the stop 21 on the bracket 10, and the plate 23 of the branch pipe 4 contacts by its surface the roller 22 on the stop 21.

In the afore-described closed position of the gate the rod 34 of the cylinder 5 is extended to the right (according to the drawing), and the crank 33 is also turned into the extreme right (according to the drawing) position.

When it is necessary to unseal the gate and to bring it to the position providing for transit passage of containers therethrough, the rod 34 of the cylinder 5 is moved to the left (according to the drawing), whereby the crank 33 and, consequently, the shaft 30 rigidly connected therewith turn in the bearing counter-clockwise (according to the drawing).

Thereby, the ties 29 rigidly connected with the shaft 30 also turn counter-clockwise and with their bevels 38 press the bevels 39 of the spring-loaded arm of the lever 15, whereby the springs 19 are compressed, the levers 15 turn on the axles 16 and their hooks 17 disengage the hooks 18 of the intermediate link 12. The gate is unlocked, with the axles of the joints 28 sliding in the guide slots 41 made in the ties 25 during the unlocking. From the moment the hooks 17 and 18 are mutually disengaged the branch pipe 4 and the axles II on the intermediate links 12 swing relative to the axles 8 on the brackets 10 under the action of the force transmitted from the cylinder 5 via the ties 25 and 29 to the axles 24 secured on the branch pipe 4 to the right up to the stops 13. Thereby, the branch pipe 4 is locked relative to the links 12 due to the fact that, one one hand, the stops 40 of the branch pipe 4 slide along the stationary stops 21 on the brackets 10 and, on the hand, the plates 23 roll with their flat surfaces over the rollers 22. As a result, the branch pipe 4 and, consequently, the damper 5 with the sealing member 7 are brought away from the branch pipe 2 and move practically translationally in a direction perpendicular to the hermetic sealing plane.

This movement of the damper during unsealing provides for a minimal wear of the sealing member 7.

On having reached the stops 13, the links 12 discontinue their movement, and the plates 23 come out from under the rollers 22 thereby releasing the axles II and, consequently the branch pipe 4. The next moment the released branch pipe 4 starts turning clockwise relative to the links 12 under the action of the force of the drive 5. The ties 25 get aligned with the ties 29, the branch pipe turns through 90° and occupies the position when containers can go freely through the gate.

To bring the gate into the position in which the branch pipe 2 is overlapped, the same operations are to be performed in the reverse order.

INDUSTRIAL APPLICABILITY

It is most expedient to mount the gate of the pipe-line, built in accordance with the present invention in pipe-lines which are of a relatively small diameter and are used for transporting, for example books within big libraries.

The gates can be also used in other pneumatic conveyers used as means of transportation within plants.

We claim:

1. A gate of a pipe-line of a pneumatic conveyer of containers, comprising a body hermetically connected with inlet and outlet branch pipes arranged coaxially relative to each other and connected to the pipe-line of the pneumatic conveyer, which pipe-line accomodates a branch pipe of a cross-section corresponding to the cross-sections of the inlet and outlet branch pipes, is kinematically connected to a turn drive to be connected to the inlet and outlet branch pipes, and carries a flat damper to overlap one of the branch pipes connected to the body, the improvement comprising the damper (6) used for overlapping one of the branch pipes (2) is rigidly secured to the outer wall of the branch pipe (4) disposed in the body (1) and has a ring-like sealing member (7) which is made from a resilient material and whose shape corresponds to the cross-section of the branch pipe (2) to be overlapped, the branch pipe (4) being mounted in the body (1) so that it can swing to a certain extent in a plane perpendicular to the plane of the damper (6) and relative to an axis (8) passing below the longitudinal axis (9) of the inlet (2) and outlet (3) branch pipes, and being provided with a catch (14) of the position of the branch pipe (4) when one of the branch pipes is overlapped, said catch being actuated by the drive (5) turning the branch pipe (4).

2. A gate according to claim 1, characterized in that one of its walls serves as the damper (6) in case the branch pipe (2, 3) is of a rectangular cross-section.

* * * * *